UNITED STATES PATENT OFFICE.

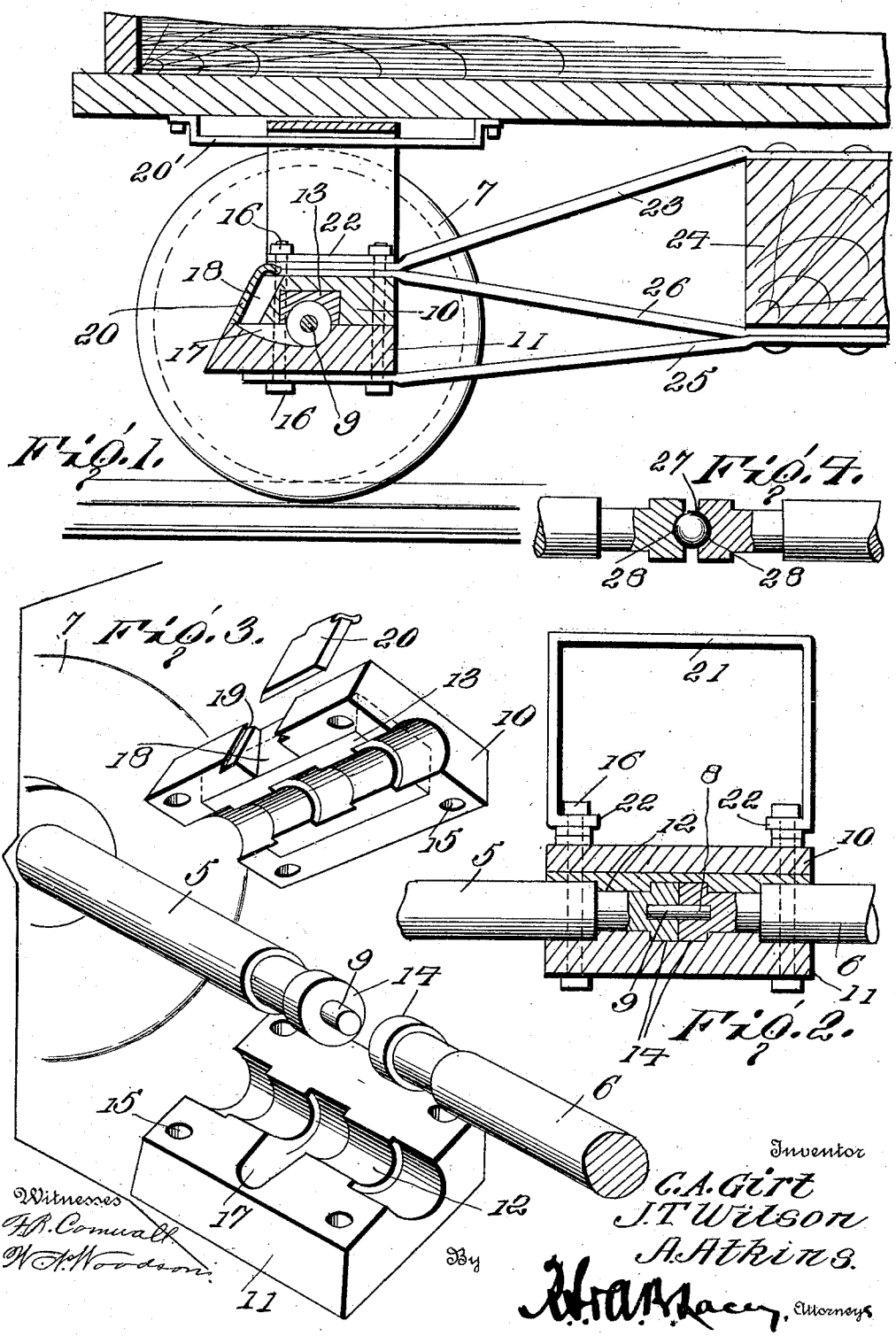

CHARLES A. GIRT, JOHN T. WILSON, AND ALBERT ATKINS, OF RAINIER, OREGON.

INDEPENDENT CAR-AXLE.

977,002.  Specification of Letters Patent.  Patented Nov. 29, 1910.

Application filed April 12, 1910. Serial No. 555,124.

*To all whom it may concern:*

Be it known that we, CHARLES A. GIRT, JOHN T. WILSON, and ALBERT ATKINS, citizens of the United States, residing at Rainier, in the county of Columbia and State of Oregon, have invented certain new and useful Improvements in Independent Car-Axles, of which the following is a specification.

This invention relates to car axles and more particularly to a sectional axle especially designed for use on the trucks of passenger cars, freight cars, logging cars and other railway rolling stock.

The object of the invention is to provide an axle formed of independent sections having their inner ends journaled in a suitable casing suspended from the bottom of the car so as to permit free rotation of one axle section relatively to the other when traveling around curves.

A further object is to form the inner ends of the axle sections with registering recesses adapted to receive a connecting pin or ball, thus to maintain said sections in longitudinal alinement and at the same time reduce friction between the parts.

A further object is to provide means for suspending the axle casing or boxing from the bottom of the car, and means for supplying lubricant to the inner ends of the axle sections.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction, reference is to be had to the following description and accompanying drawings, in which:

Figure 1 is a vertical sectional view of the front portion of a car truck provided with a sectional axle constructed in accordance with our invention; Fig. 2 is a detail vertical sectional view of the casing or boxing, the suspension bracket being shown in elevation; Fig. 3 is a perspective view showing the casing sections detached and the inner end of the axle sections in position to enter the casing; Fig. 4 is a detail sectional view partly in section illustrating a modified form of the invention.

Corresponding and like parts are referred to in the following description and indicated in all the views of the drawings by the same reference characters.

The car axle forming the subject matter of the present invention is preferably formed in two sections 5 and 6 having their outer ends provided with the usual flanged wheels 7 and their inner ends formed with registering recesses 8 adapted to receive a connecting pin 9. The pin 9 is loosely mounted in the seating recesses 8 so as to prevent friction between the parts, said pin serving to maintain the axle sections in longitudinal alinement at all times.

Depending from the bottom of the car, is a casing or boxing also preferably formed in two sections 10 and 11, said sections having their abutting faces formed with registering grooves 12 constituting bearings for the adjacent axle sections 5 and 6.

Seated in one or both of the casing sections, is a brass 13 which engages suitable collars 14 turned or shrunk on the inner ends of the axle sections. The casing sections 10 and 11 are formed with vertically alined openings 15 adapted to receive bolts or similar fastening devices 16 by means of which the casing sections are held in assembled position. The lower casing section 11 is provided with a downwardly inclined groove 17 which registers with the brass 13 and by means of which oil or other lubricant may be fed to inner ends of the axle sections. The front edge of the upper casing section 10 is provided with a vertically disposed opening 18 which registers with the groove 17. The side walls of the opening 18 are provided with dove-tailed grooves 19 between which is slidably mounted a gate or closure 20 so that by elevating the gate or closure 20, cotton, waste or other lubricant may be introduced through the opening 18 into the groove 17 for the purpose of lubricating the parts.

Secured to the bottom of the car is a rub iron 20′ from which is suspended a bracket 21, the latter being preferably formed of a single piece of metal having its intermediate portion extended over the rub iron and its opposite ends bent downwardly and thence inwardly to form horizontally disposed flanges 22 having openings formed therein and registering with the openings 15 to permit the passage of the bolts 16.

The suspension bracket 21, by engagement with the rub iron, serves to support the boxing or casing on the bottom of the car and also serves to prevent accidental displacement of said casing should the axle sections break. The casing or boxing is further reinforced and strengthened by the provision of spaced truss rods 23, the ends of which are interposed between the flanges 22 and the upper casing section 10 of one boxing, while the intermediate portions of the truss rods 23 are extended over the center bolster 24 of the truck, as shown, for attachment to the casing or boxing on the opposite side of said bolster.

Horizontal braces 25 are secured to the opposite ends of each boxing or casing and extend beneath the bottom of the center bolster 24, there being auxiliary inclined braces 26 secured to the opposite ends of the casings on opposite sides of the bolster and also extended beneath said bolster, as shown.

Attention is here called to the fact that the bolts or fastening devices 16 not only serve to retain the casing sections in assembled position, but by engagement with the flanges 22 of the suspension brackets 21 and the adjacent ends of the braces 23, 25 and 26, serve to rigidly clamp said braces in engagement with the casings, thus to produce a strong, rigid structure and effectually prevent accidental displacement of said casings. If desired, the connecting pin 9 may be dispensed with and a ball 27 interposed between the abutting ends of the axle sections 6, as best shown in Fig. 4 of the drawings, and in some cases the axle sections may be of uniform cross-sectional diameter and the collars 14 larger than the axle. When a ball is interposed between the axle sections, the inner ends of said sections will be provided with correspondingly shaped sockets 28 for the reception of said ball, as shown.

Having thus described the invention, what is claimed as new is:

1. The combination with a car including a truck, of a casing suspended from the bottom of the car and free to move independently of the car, and a sectional axle, the inner ends of which are journaled in said casing and provided with registering recesses, and a single coupling member seated in said recesses and forming a connection between the axle sections.

2. The combination with a car including a truck, of a rub iron secured to the bottom of the car, a casing, a bracket suspended from the rub iron and secured to the casing, an axle journaled in the casing and formed of mating sections having their abutting ends provided with registering recesses, and a coupling member seated in said recesses and forming a connection between the axle sections.

3. The combination with a car including a truck, of a sectional casing, an axle journaled in the casing and formed of mating sections, a rub iron secured to the bottom of the car, a bracket suspended from the rub iron and provided with flanges bearing against the upper casing section, and fastening devices extending through the flanges of the bracket and engaging the sections of the casing for clamping the several parts in assembled position.

4. The combination with a car including a truck, of a casing suspended from the bottom of the car and formed of mating sections provided with registering grooves, a sectional axle journaled in the grooves of the casing, there being an inclined groove formed in one of the casing sections for the reception of a lubricant, and a cover slidably mounted on the other casing section and forming a closure for the outer end of the inclined grooves.

5. The combination with a car including a truck, of a casing suspended from the bottom of the car and formed of mating sections, one of which is provided with a groove for the reception of a lubricant and the other with an opening communicating with said groove and having its side walls provided with dove-tailed recesses, a cover slidably mounted in the dove-tailed recesses and forming a closure for the groove and opening, respectively, an axle formed of mating sections, and fastening devices piercing said casing sections for holding the latter in assembled position.

6. The combination with a car including a truck, of a casing including mating sections having registering perforations formed therein, a rub iron secured to the bottom of the car, a bracket having its intermediate portion engaging the rub iron and its opposite ends bent downwardly and thence inwardly to form perforated flanges bearing against the upper casing section, a sectional axle journaled in the casing sections, and bolts extending through the perforations in the flanges and casing sections for clamping the parts in assembled position.

7. The combination with a car including a truck, having a center bolster, of a sectional casing disposed on each side of the bolster, sectional axles journaled in said casings, suspension brackets having inwardly extending flanges adapted to bear against the upper section of each casing, truss rods having their opposite ends interposed between the flanges of the brackets and the adjacent casing sections and their intermediate portions extended over the top of the center bolster, horizontal braces extending beneath the bottom of the center bolster and connected with the casing sections, and bolts passing through the flanges, truss rods, horizontal braces and casing sections for securing the parts in assembled position.

8. The combination with a car including a truck having a center bolster, of a sectional casing disposed on each side of the bolster, a sectional axle journaled in each casing, suspension brackets having inwardly extending flanges bearing against the upper section of each casing, truss rods having their opposite ends interposed between the flanges of the brackets and the adjacent upper casing sections and their intermediate portions extended over and bearing against the top of the center bolster, horizontal braces bearing against the bottom of the center bolster and engaging the lower casing section, auxiliary braces interposed between the flanges and upper casing section and also extending beneath the bottom of the bolster, and fastening devices piercing the flanges, casing sections and adjacent braces for rigidly securing the several parts in assembled position.

In testimony whereof, we affix our signatures in presence of two witnesses.

CHARLES A. GIRT. [L. S.]
JOHN T. WILSON. [L. S.]
ALBERT ATKINS. [L. S.]

Witnesses:
  GEO. W. VOGEL,
  N. D. JOHNSON.